United States Patent
Voleti et al.

(10) Patent No.: US 7,174,482 B2
(45) Date of Patent: Feb. 6, 2007

(54) PROCESS CONTROL BUS MONITORING AND ANALYSIS

(75) Inventors: Sreekanth Voleti, B-lore (IN); Rajasekhar Vallabhaneni, Bellevue, WA (US); Kamal Raju Venkatesh, Bangalore (IN)

(73) Assignee: Honeywell International Inc., Morristown, NY (US)

( * ) Notice: Subject to any disclaimer, the term of this patent is extended or adjusted under 35 U.S.C. 154(b) by 1300 days.

(21) Appl. No.: 09/849,916

(22) Filed: May 4, 2001

(65) Prior Publication Data

US 2003/0037135 A1    Feb. 20, 2003

(51) Int. Cl.
*G06F 11/00* (2006.01)
(52) U.S. Cl. .......................... 714/39; 714/43
(58) Field of Classification Search ............... 714/39, 714/40, 43
See application file for complete search history.

(56) References Cited

U.S. PATENT DOCUMENTS

| | | | | |
|---|---|---|---|---|
| 5,289,474 A | * | 2/1994 | Purcell et al. | 714/716 |
| 5,796,721 A | * | 8/1998 | Gretta, Jr. | 370/245 |
| 5,923,673 A | * | 7/1999 | Henrikson | 714/712 |
| 5,982,294 A | * | 11/1999 | Takayama et al. | 340/7.44 |
| 6,070,250 A | | 5/2000 | Yeager et al. | |
| 6,178,531 B1 | * | 1/2001 | Kolb | 714/715 |
| 6,292,908 B1 | * | 9/2001 | Arimilli et al. | 714/39 |
| 6,766,479 B2 | * | 7/2004 | Edwards, Jr. | 714/43 |
| 6,792,563 B1 | * | 9/2004 | DesRosier et al. | 714/43 |
| 6,826,747 B1 | * | 11/2004 | Augsburg et al. | 717/128 |
| 6,883,117 B2 | * | 4/2005 | Centanni et al. | 714/37 |
| 2001/0027543 A1 | * | 10/2001 | Tsai et al. | 714/43 |
| 2003/0037135 A1 | * | 2/2003 | Voleti et al. | 709/224 |

* cited by examiner

*Primary Examiner*—Scott Baderman
*Assistant Examiner*—Joshua Lohn
(74) *Attorney, Agent, or Firm*—Kris T. Fredrick (57) ABSTRACT

A computer implemented method analyzes packets of data in frames on a process control bus. A frame is first selected, and a text file representative of specifications for the process control bus communication protocol is used to identify function code formats and calculate values and descriptions for the fields. A display of the values and fields is provided to the user. The display comprises a multi-pane screen of information that facilitates a user selecting a packet on the bus and view an interpretation of the data in the packet including values and descriptions for function codes as well as identifying the origination of the packet.

23 Claims, 7 Drawing Sheets

PROCESS CONTROL BUS MONITORING AND ANALYSIS

FIELD OF THE INVENTION

The present invention relates to process control bus monitoring and analysis, and in particular to an efficient and user friendly method and apparatus for such monitoring and analysis.

BACKGROUND OF THE INVENTION

Many protocols are used for communication in the process control environment. Data transferred on a bus will usually be in coded form. Data is in a numerical format (i.e. decimal format) or binary format (combination of zeros and ones) or hexadecimal format (0–9 and A to F). A group of data is usually called a packet or a frame. Frames may also consist of multiple packets. A packet defines a method of arranging real world information like source address, destination address, type of packet, data, checksum etc.

In order to verify that the bus is functioning properly and devices on the bus are working as expected, it is necessary to understand each packet of data that is sent on the bus. Generally, analysis of packets is done manually by a developer during development, by an installation engineer during installation of a system, or by a person trouble shooting an installed system to help in identifying which device is not functioning properly. Each packet is observed and interpreted by looking at manuals or other related documents. The analysis is error prone, as the packet structure becomes complex for advanced control protocols.

In one protocol, Modbus, a master device queries a slave device, which gives a response to the query. A typical masterpacket might look like "010200000001B9CA", while a slave packet might look like "0102020000B9B8". The data packet from a slave consists of slave address "01", function codes "02" identifying the type of information, data "00000001" and a cyclical redundancy check (CRC) "B9CA". For a master packet, the first byte is a slave address "01", followed by a function code "02", CRC "B9B8" and remaining data "020000", where "02" is data length, "0000" is data with some meaning attached. Typical meanings include whether the information is regarding the status of the device or control data of the device. A CRC is used to check whether the packet is received correctly or not. Manually determining all of this information can be a cumbersome, error prone process.

There is a need for analysis tools to aid in interpretation of packets which is easy to use and reduces errors.

SUMMARY OF THE INVENTION

A computer implemented method analyzes packets of data in frames on a process control bus. A frame is first selected, and a text file representative of specifications for the process control bus communication protocol is used to identify function code formats. and calculate values and descriptions for the fields. A display of the values and fields is provided to the user. The display comprises a multi-pane screen of information that facilitates a user selecting a packet on the bus and viewing an interpretation of the data in the packet including values and descriptions for function codes as well as identifying the origination of the packet.

In one embodiment, the text file is converted to a data structure to facilitate matching the fields in the frames to the information from the text file. In a further embodiment, computer instructions for causing a computer to perform the method are encoded and stored on a computer readable medium.

In a further embodiment, a system for interpreting packets on a process control bus has a communication module for coupling to the process control bus. A receive queue receives a frame from the communication module. A receive module compares records in the frame with records in an interpretation file to provide a user viewable interpretation of the frame. A statistics module is coupled to the receive queue for generating statistics regarding frames received from the process control bus in a further embodiment.

Further embodiments include a data link layer, an interpretation editor for modifying the interpretation files, a log file coupled to the interpretation file, and an offline viewer coupled to the log files and interpretation file that interprets data packets in frames.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Figure 1:
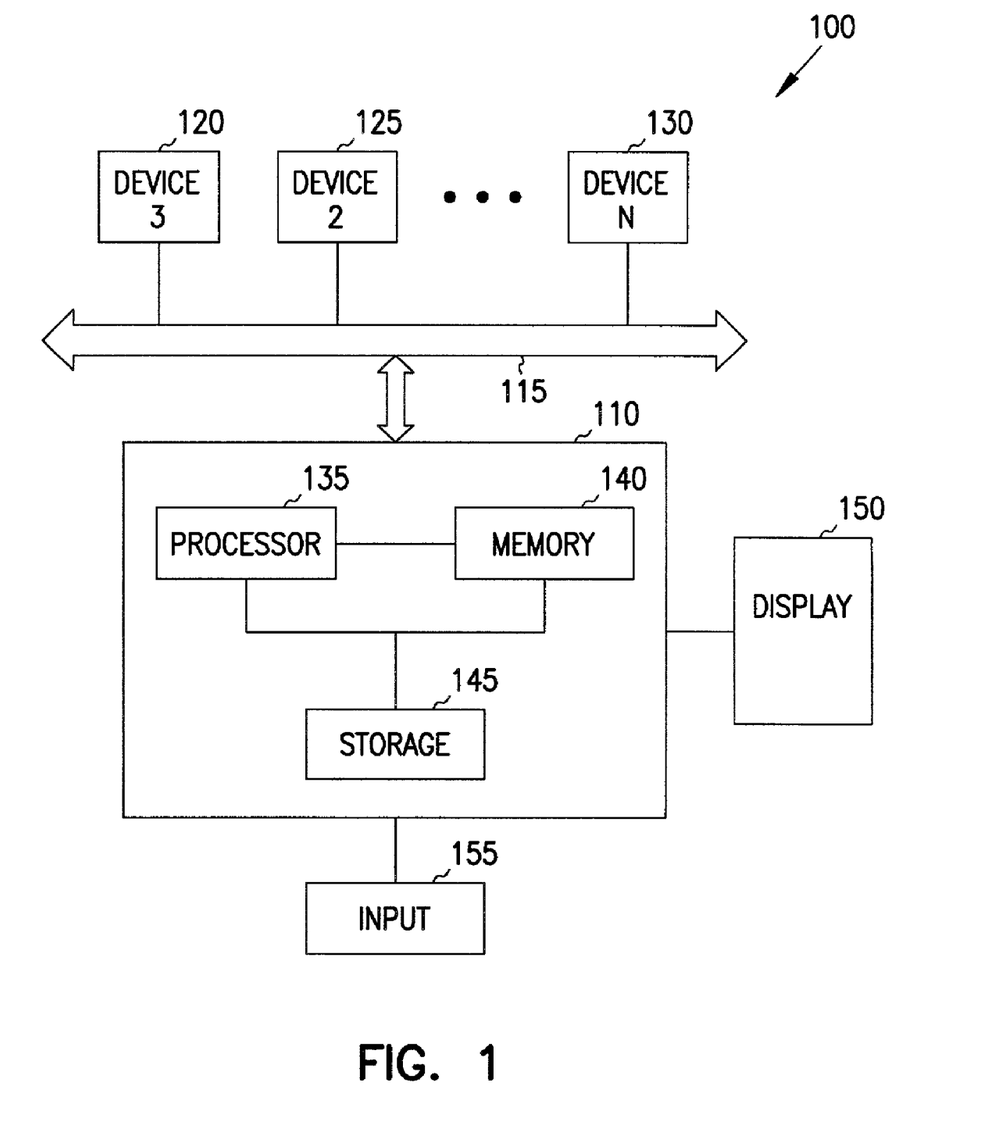
FIG. 1 is a block diagram of a process control system that implements a protocol analysis method in accordance with the present invention.

A process control system implementing the present invention is indicated generally at 100 in FIG. 1. FIG. 1 is a high level block diagram of one kind of process control system that can benefit from the present invention. It should be recognized that many other process control systems may benefit, including distributed processing control systems. A controller 110 sends and receives communications via a bus 115 to multiple devices 120, 125 and 130. The bus is a redundant bus in some embodiments, and the devices include sensors, actuators, motors, valves, and many other types of devices commonly used in a process control environment.

A typical controller includes one or more processors 135 and memory devices 140 coupled to a longer term non-volatile storage device 145. Again, many other types of controllers may also benefit from the present invention. A display device is coupled to the controller 110 to provide visual or audible information to a person working with the system. One or more input devices 155 are also provided. These include touch screens, keyboards, pointing devices, voice recognition devices and any other means by which a person or other machine may communicate with the controller 110.

Communications on bus 115 occur between the controller and devices in accordance with a predetermined bus protocol. One such protocol comprises a Modbus protocol. Each protocol has specifications describing the format and position, or data pattern of information being transferred over the bus.

In the Modbus protocol, a master device queries a slave device, which gives a response to the query. A typical master packet might look like "010200000001B9CA", while a slave packet might look like "0102020000B9B8". The data packet from a slave consists of slave address "01", function codes "02" identifying the type of information, data "00000001" and a cyclical redundancy check (CRC) "B9CA". For a master packet, the first byte is a slave address "01", followed by a function code "02", CRC "B9B8" and remaining data "020000", where "02" is data length, "0000" is data with some meaning attached. The Modbus protocol specifications provide the following information to aid in deciphering the data patterns.

```
#02h, Status Data Read
02h, 0000, Enthalpy status, 0, 0, U1,, 0,, {0 = Not OK to economize, 1 = OK to
economize}
    02h, 0000, Power exhaust status, 0, 1, U1,, 0,, {0 = Inactive, 1 = Active}
    02h, 0000, Enthalpy Configuration, 0, 2, U2,, 0,, {0 = Dry bulb, 1 = Ref., 2 =
Comparative}
    02h, 0000, Reserved, 1, 4, U4,, 0,,,
Enthalpy Status can be calculated manually as follows:
02h, 0000, Enthalpy status, 0, 0, U1,, 0,, {0 = Not OK to economize, 1 = OK to
economize}
```

The above sentence has the following meaning attached to it

| Field 1 | Function code | 02h |
|---|---|---|
| Field 2 | Function Address | 0000 |
| Field 3 | Data Name | Enthalpy status |
| Field 4 | Start Byte | 0 |
| Field 5 | Start Bit | 0 |
| Field 6 | Field Type & Length | Unsigned 1 bit |
| Field 7 | Multiplication Factor | Empty, which means 1 by default |
| Field 8 | Offset | 0 |
| Field 9 | Units | Empty, which means No units |
| Field 10 | Interpretation Enumeration | 0 = Not OK to economize, 1 = OK to economize |

$$\text{Enthalpy Status value} = (\text{value} * \text{multiplication factor}) + \text{offset}$$

$$= (0 * 1) + 0$$

$$= 0$$

The Interpretation Enumeration says if enthalpy status=0 then the user can understand it as "Not OK to Economize".

Similar calculations are done manually for Enthalpy configuration, power exhaust status and reserved.

| Field Name | Value | Units & Interpretation |
|---|---|---|
| Enthalpy configuration | 0.0 | Dry Bulb configuration |
| Enthalpy Status | 0.0 | Not OK to economize |
| Power exhaust status | 0.0 | Inactive |
| Reserved | 0 | — |

Figure 2:
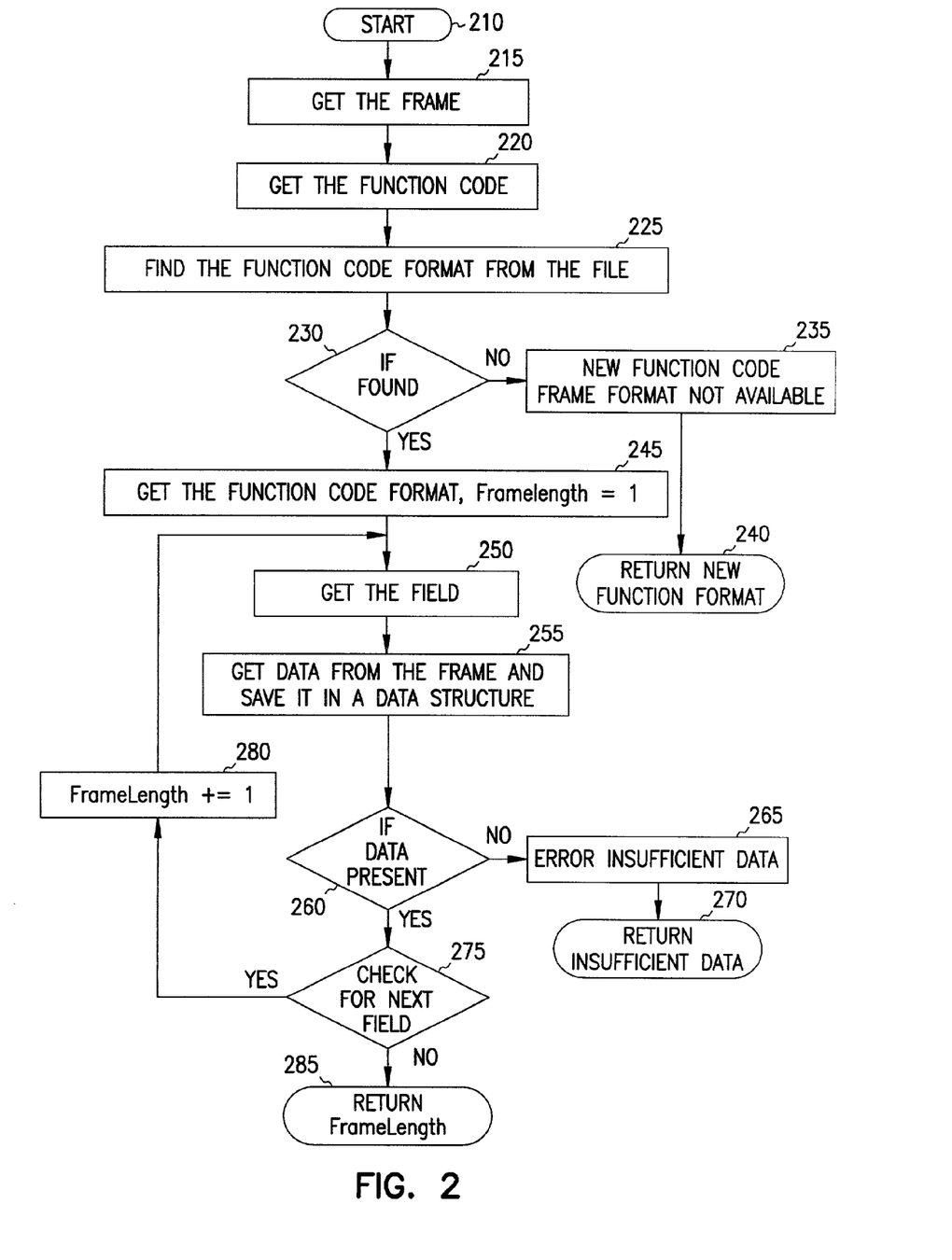
FIG. 2 is a flow chart showing the protocol analysis method of FIG. 1.

To automate the analysis of the data patterns, a tool that functions in accordance with the flowchart of FIG. 2 is provided. A text file is used while automating this analysis. The text file contains the data, which has details about the data packets that are moving on the control bus. Values for fields such as Enthalpy, dry bulb configuration etc., are determined. When the application starts, the application reads the text file and stores the data in a data structure.

Whenever the user selects a data packet for analysis, the application gets the necessary information from the data packet and looks for a matching record in the data structure. Once a match is found, the application analyzes the data and gives the information to the user interface.

The user initiates the analysis at 210, and selects a frame to analyze at 215 The function code is obtained from the frame at 220, and the function code format is searched for from the text file at 225. If the function code format is not found at 230, block 235 indicates that a new function code frame format is not available, and a new function format messages is returned at 240 to the user.

If the function code format is found at 230, a function frame format is retrieved, and frame length is initialized to equal 1 at 245. The field is then obtained at 250. Data from the frame is obtained at 255 and saved in a data structure as shown in the file shown following this paragraph. If the data is not present at 260, an error message indicating that there was insufficient data is generated at 265 and returned to the user at 270. If the data is present, a check is made for the next field at 275. If there is a next field, 1 is added to the frame length, and the next field is obtained at 250. This loop iterates until there are no further fields, whereupon the frame length is returned at 285.

Function Code Formats:

```
#define is a programming language convention.
******************************************************
#define Fnc01Query "Slave_Address1, FncCode1, AddHi1, AddLo1,
PointsHi1, PointsLo1, Crc2,"
#define Fnc01Response "Slave_Address1, FncCode1, ByteCount1, Data1,
Crc2,"
******************************************************
#define Fnc01Query "Slave_Address1, FncCode1, AddHi1, AddLo1,
PointsHi1, PointsLo1, Crc2,"
Here Fnc01Query means function code 01 and message is of type Query
Slave_Address1    means field name is Slave Address and length of the
field is 1 Byte
FncCode1          means field name is Function Code and length is 1
Byte
AddHi1            means field name is address High and length is 1 Byte
AddLo1            means field name is address Low and length is 1 Byte
PointsHi1         means field name is points High and length is 1 Byte
PointsLo1         means field name is points low and length is 1 Byte
Crc2              means field name is CRC and length is 2 Bytes
#define Fnc01Response "Slave_Address1, FncCode1, ByteCount1, Data1,
Crc2," Fnc01Response means function code 01 and message is of type
Response
Slave_Address1    means Slave Address and length is 1 Byte
FncCode1          means Function code and length is 1 Byte
ByteCount1        means Byte count and length is 1 Byte
Data1             means Data and length is 1 byte
Crc2              means CRC and length is 2 bytes
```

The text file is flexible enough for the end user to modify accordingly to suit their needs. It is used by finding a value in the frame and matching it to a corresponding verbal description from the text file to determine the state of function codes. The following is a sample text file:

Example Text File

Modbus Monitoring Tool (MMT) Message Interpretation File, Rev 0.9.3 (Working).

```
; Enviracom Monitoring Tool (EMT) Message Interpretation
File, Rev 0.9.3 (Working)
28-Nov-2000
#02h, Status Data Read
02h, 0000, Enthalpy status, 0, 0, U1,, 0,,
{0 = Not OK to economize, 1 = OK to
economize}
    02h, 0000, Power exhaust status, 0, 1, U1,, 0,,
    {0 = Inactive, 1 = Active}
    02h, 0000, Enthalpy Configuration, 0, 2, U2,, 0,,
    {0 = Dry bulb, 1 = Ref., 2 =
Comparative}
    02h, 0000, Reserved, 1, 4, U4,, 0,,,
#01h, Control data Read,
    01h, 0000, Call for Cooling, 0, 0, U1,, 0,,
    {0 = No Cooling, 1 = Cooling demand}
    01h, 0000, Fan state, 0, 1, U1,, 0,, {0 = Inactive, 1 = Active}
    01h, 0000, Occupancy state, 0, 2, U1,, 0,,
    {0 = Unoccupied, 1 = Occupied}
    01h, 0000, Enthalpy Control, 0, 3, U1,, 0,, {0 = Disabled,
    1 = Enabled}
    01h, 0000, Enthalpy Mode, 0, 4, U1,, 0,, {0 = Normal, 1 = Override}
    01h, 0000, Shutdown, 0, 5, U1,, 0,, {0 = Normal, 1 = Shutdown}
    01h, 0000, Baud rate, 0, 6,U2,, 0,, {0 = 1200,
    1 = 2400, 2 = 9600, 3 = 19.2k}
    01h, 0000, Slave address, 1, 0, U2,, 0,,,
        01h, 0000, Reserved, 1, 3, U6,, 0,,,
```

The manual document has much more detail than is needed. It is likely that a user may have to make notes about things like what function codes are available and how they can be evaluated. The text file that is used in the present invention contains all the information needed for computing the values of fields in a frame in an easier manner. A larger sample text file follows:

```
;*#*#*#*#* Message Header Entry syntax *#*#*#*#*
;Frame structure is as follows
;for Query frames with function codes01, 02, 03, 04, 05, 06, 10,
;slaveid, function code, Address High, Address Low, # of Points High, # of Points Low,
;Data high, Data Low, CRC Low, CRC high
;for frames with function code 08
;slaveid, function code, subfunctionHi, subfunctionLo, Data Hi,
;Understanding Query frame
;Each item occupies one byte
;for Response frame
;slave id, function code, Byte count, Data High, Data Low, ..., , CRC Low, CRC high
;Slave id is not considered
;#function code
;    # is compulsory before function code
;Byte count is an integer that represents number of bytes of data present in the frame
;Data high, data low ..., each represent one byte of data
;CRC occupies the last 2 bytes
; *$*$*$*$*$* Data Field Entry syntax *$*$*$*$*$*
;
; Function code, Data Name, Start byte, Start bit, Field Type & Length, Multiplication
;Factor, Units,[{Interpretation Enumerations}]
; ** explanation **
; Field 1 : Function code
;      Function code
; Field 2 : Data Name
;       - The text entered here will be shown as is while interpreting this field as data
;name.
; Field 3 : Start Byte
;       - The byte at which the data is to be taken for interpretation.
;       - 0 based.
```

```
; Field 4 : Start Bit
;          - The bit from which the data is to be taken for interpretation.
;          - 0 based.
; Field 5 : Field Type & Length
;          - This field gives information about the type of the field as
;               U - Unsigned
;               S - Signed
;          Along with this field type the data Length and Fraction part are also
;required to be mentioned as
;               S8.2 - Signed, 8 bits data in which 2 bit fraction.
;               U6.0/U6 - Unsigned, 6 bits data and no fraction
;          - This field is case insensitive.
; Field 6 : Multiplication Factor
;          - The data of this field is multiplied with the number given here before
;interpreting. This can be float also.
;          -The blank entry here is taken as 1.
; Field 7 : Offset
;               The data of this field is added with the calculated value
;Field 8 : Units
;          - This is field to enter Engineering Units. The Text here is shown as is in place
;of Units.
;          -sometimes % can also be associated with the Engineering Units
; Field 9: {Interpretation Enumerations}
;          - This field will be useful to indicate text replacements when the read field data
;matches some pre-defined value.
;          - Ex :- {10–20 = Initial, 20h–30h = Final, FFh = UNKNOWN}
;               If the read value of this field falls in between Decimal 10 to 20 then
;"Initial" is shown in place of value.
;               If the read value of this field falls in between Hexa Decimal 20h to 30h
;then "Final" text is shown in place of value.
;               If the read value for this field matches Hexa Decimal FFH then
;"UNKNOWN" is shown in place of value.
;          - This entry is optional.
;          - The entries for this field has to be covered under flower braces '{''}'
;          - The entries are comma delimited. See example above.
;          - It is allowed to make multiple entries after comma delimition. See example
;above.
;
; *$*$*$*$*$* End of Data Field Entry syntax Info *$*$*$*$*$*
#01h, Control data Read,
     01h, 0000, Call for Cooling, 0, 0, U1,, 0,,{0 = No Cooling, 1 = Cooling demand}
     01h, 0000, Fan state, 0, 1, U1,, 0,,{0 = Inactive, 1 = Active}
     01h, 0000, Occupancy state, 0, 2, U1,, 0,,{0 = Unoccupied, 1 = Occupied}
     01h, 0000, Enthalpy Control, 0, 3, U1,, 0,,{0 = Disabled, 1 = Enabled}
     01h, 0000, Enthalpy Mode, 0, 4, U1,, 0,,{0 = Normal, 1 = Override}
     01h, 0000, Shutdown, 0, 5, U1,, 0,,{0 = Normal, 1 = Shutdown}
     01h, 0000, Baud rate, 0, 6,U2,, 0,,{0 = 1200, 1 = 2400, 2 = 9600, 3 = 19.2k}
     01h, 0000, Slave address, 1, 0, U2,, 0,,,
     01h, 0000, Reserved, 1, 3, U6,, 0,,,
#05h, Control data Write
     05h, 0000, Call for Cooling, 0, 0, U1,, 0,,{0 = No Cooling, 1 = Cooling demand}
     05h, 0000, Fan state, 0, 1, U1,, 0,,{0 = Inactive, 1 = Active}
     05h, 0000, Occupancy state, 0, 2, U1,, 0,,{0 = Unoccupied, 1 = Occupied}
     05h, 0000, Enthalpy Control, 0, 3, U1,, 0,,{0 = Disabled, 1 = Enabled}
     05h, 0000, Enthalpy Mode, 0, 4, U1,, 0,,{0 = Normal, 1 = Override}
     05h, 0000, Shutdown, 0, 5, U1,, 0,,{0 = Normal, 1 = Shutdown}
     05h, 0000, Baud rate, 0, 6,U2,, 0,,{0 = 1200, 1 = 2400, 2= 9600, 3 = 19.2k}
     05h, 0000, Slave address, 1, 0, U2,, 0,,,
     05h, 0000, Reserved, 1, 3, U6,, 0,,,
02h, Status Data Read
     02h, 0000, Enthalpy status, 0, 0, U1,, 0,, {0 = Not OK to economize, 1 = OK to economize}
     02h, 0000, Power exhaust status, 0, 1, U1,, 0,, {0 = Inactive, 1 = Active}
     02h, 0000, Enthalpy Configuration, 0,2, U2,, 0,, {0 = Dry bulb, 1 = Ref., 2 = Comparative}
     02h, 0000, Reserved, 1, 4, U4,, 0,,,
#03h, Parameter Data Read/Write
     03h, 40000, Maximum DMP, 1, 0, U8, 1, 0, %,,
     03h, 40000, PExPoint, 0, 0, U8, 1, 0, %,,
;    03h, 40001, Configured DMP, 1, 0, U8, 1, 0, %,,
     03h, 40001, Configured DMP, 1, 7, U1, 1, 0, %, {0 = Configured locally
(potentiometer), = 1 configured remotely(master)}
     03h, 40001, Active DMP, 0, 0, U8, 1, 0, %,,
     03h, 40002, Enthalpy Setpoint, 1, 6, U2, 2, 0, bits, {0 = A, 1 = B, 2 = C, 3 = D}
     03h, 40002, Current Damper Position, 1, 0, U6, 1, 0, %,,
     03h, 40002, MA SetPoint, 0, 0, U8, 0.1, 0, degrees F.,
```

-continued

```
; offset exists for this 40 F
    03h, 40003, IAQ Setpoint, 1, 0, U8, 10, 0, ppm,,
    03h, 40003, OAQ set point, 0, 0, U8, 10, 0, ppm,,
#06h, Parameter Data Read/Write
    06h, 40000, Maximum DMP, 1, 0, U8, 1, 0, %,,
    06h, 40000, PExPoint, 0, 0, U8, 1, 0, %,,
;   06h, 40001, Configured DMP, 1, 0, U8, 1, 0, %,,
    06h, 40001, Configured DMP, 1, 7, U1, 1, 0, %, {0 = Configured locally
(potentiometer), 1 = configured remotely(master)}
    06h, 40001, Active DMP, 0, 0, U8, 1, 0, %,,
    06h, 40002, Enthalpy Setpoint, 1, 6, U2, 2, 0, bits, {0 = A, 1 = B, 2 = C, 3 = D}
    06h, 40002, Current Damper Position, 1, 0, U6, 1, 0, %,,
    06h, 40002, MA SetPoint, 0, 0, U8, 0.1, 0, degrees F.,
; offset exists for this 40 F
    06h, 40003, IAQ Setpoint, 1, 0, U8, 10, 0, ppm,
    06h, 40003, OAQ set point, 0, 0, U8, 10, 0, ppm,
;extended parameter data
    06h, 40010, Extended Indoor Air Quality level, 1, 0, U8, 10, 0, ppm,,
    06h, 40010, Extended Outdoor Air Quality level, 0, 0, U8, 10, 0, ppm,,
    06h, 40011, Extended Return Air Humidity value, 1, 0, U8, 1, 0, %RH,,
    06h, 40011, Extended Outdoor Air Humidity value, 0, 0, U8, 1, 0, %RH,,
    06h, 40012, Extended Return Air Temperature vale, 0, 0, U16,0.1, 0, degrees F.,
,
    06h, 40013, Extended Outdoor air temperature value, 0, 0, U16, 1, 0, degrees F.,
,
#10h, Parameter Data Read/Write
    10h, 40000, Maximum DMP, 1, 0, U8, 1, 0, %,,
    10h, 40000, PExPoint, 0, 0, U8, 1, 0, %,,
    10h, 40001, Configured DMP, 1, 0, U8, 1, 0, %,,
    10h, 40001, Configured DMP, 1, 7, U1, 1, 0, %, {0 = Configured locally
(potentiometer), 1 = configured remotely(master)}
    10h, 40001, Active DMP, 0, 0, U8, 1, 0, %,,
    10h, 40002, Enthalpy Setpoint, 1, 6, U2, 2, 0, bits,{0 = A, 1 = B, 2 = C, 3 = D}
    10h, 40002, Current Damper Position, 1, 0, U6, 1, 0, %,,
    10h, 40002, MA SetPoint, 0, 0, U8, 0.1, 0, degrees F.,
; offset exists for this 40 F
    10h, 40003, IAQ Setpoint, 1, 0, U8, 10, 0, ppm,
    10h, 40003, OAQ set point, 0, 0, U8, 10, 0, ppm,
;extended parameter data
    10h, 40010, Extended Indoor Air Quality level, 1, 0, U8, 10, 0, ppm,,
    10h, 40010, Extended Outdoor Air Quality level, 0, 0, U8, 10, 0, ppm,,
    10h, 40011, Extended Return Air Humidity value, 1, 0, U8, 1, 0, %RH,,
    10h, 40011, Extended Outdoor Air Humidity value, 0, 0, U8, 1, 0, %RH,,
    10h, 40012, Extended Return Air Temperature vale, 0, 0, U16,0.1, 0, degrees F.,
,
    10h, 40013, Extended Outdoor air temperature value, 0, 0, U16, 1, 0, degrees F.,
,
#04h, Variable Data Read
    04h, 0000, Indoor Air Quality Level, 1, 0, U8, 10, 0, ppm,,
    04h, 0000, Outdoor Air Quality Level, 0, 0, U8, 10, 0, ppm,,
    04h, 0001, Mixed Air Temperature Sensor Value, 1, 0, U8, 0.1, 0, degrees F.,,
    04h, 0001, Return Air Temperature Sensor Value, 0, 0, U8, 0.1, 0, degrees F.,,
    04h, 0002, Return Air Humidity Sensor Value, 1, 0, U8, 1, 0, %Rh,,
    04h, 0002, Outdoor Air Humidity Sensor Value, 0, 0, U8, 1, 0, %RH,,
    04h, 0003, Outdoor Air Temperature Sensor Value, 0, 0, U16, 1, 0, degrees F.
#08h, Diagnostics
    08h,,0, 0, U1,, 0, ,{1 = Acutator fault}
    08h,,,0, 1, U1,, 0, ,{1 = outdoor air quality sensor Fault}
    08h,,,0, 2, U1,, 0, ,{1 = Return Air Humidity Sensor Fault}
    08h,,,0, 3, U1,, 0, ,{1 = Return Air Temperature Sensor Fault}
    08h,,,0, 4, U1,, 0, ,{1 = Outdoor Quality Sensor Fault}
    08h,,,0, 5, U1,, 0, ,{1 = Outdoor Air Humidity Sensor Fault}
    08h,,,0, 6, U1,, 0, ,{1 = Outdoor Air Temperature Sensor Fault}
    08h,,,0, 7, U1,, 0, ,{1 = Mixed Air Temperature Sensor Fault}
    08h,,,1, 0, U1,, 0, ,{1 = RAM Write/Readback fault}
    08h,,, 1, 1, U1,, 0, ,{1 = ROM Checksum fault}
    08h,,, 1, 2, U1,, 0, ,{1 = EEPROM Checksum fault}
    08h,,,1, 3, U1,, 0, ,{1 = Thermostat fault}
;   08h,,,1, 4, U4,, 0, ,{1 = Reserved}
; interpretation or what to do if one of above errors occurs
    08h,,,0 ,0 , U16,, 0, , {00 = Echo, 01 = Reinitialization, 02= Return Diagnostics
Register, 04 = Set Listen Only Mode, 0A = Clear Counters, 0B = Bus Message Count, 0C
= Bus Communication, 0D = Bus exception Count, 0E = Slave Message Count, 0F =
Slave no response count}
#11h, Slave Configuration Data
    11h,, Slave Type, 0, 0, U8,, 0,,,
    11h,, Run Indicator, 1, 0, U8,, 0,,,
```

-continued

```
11h,, Version, 2, 0, U8,, 0,,,
11h,, Revision, 3, 0, U8,, 0,,,
#13h, Reset
```

Figure 3:
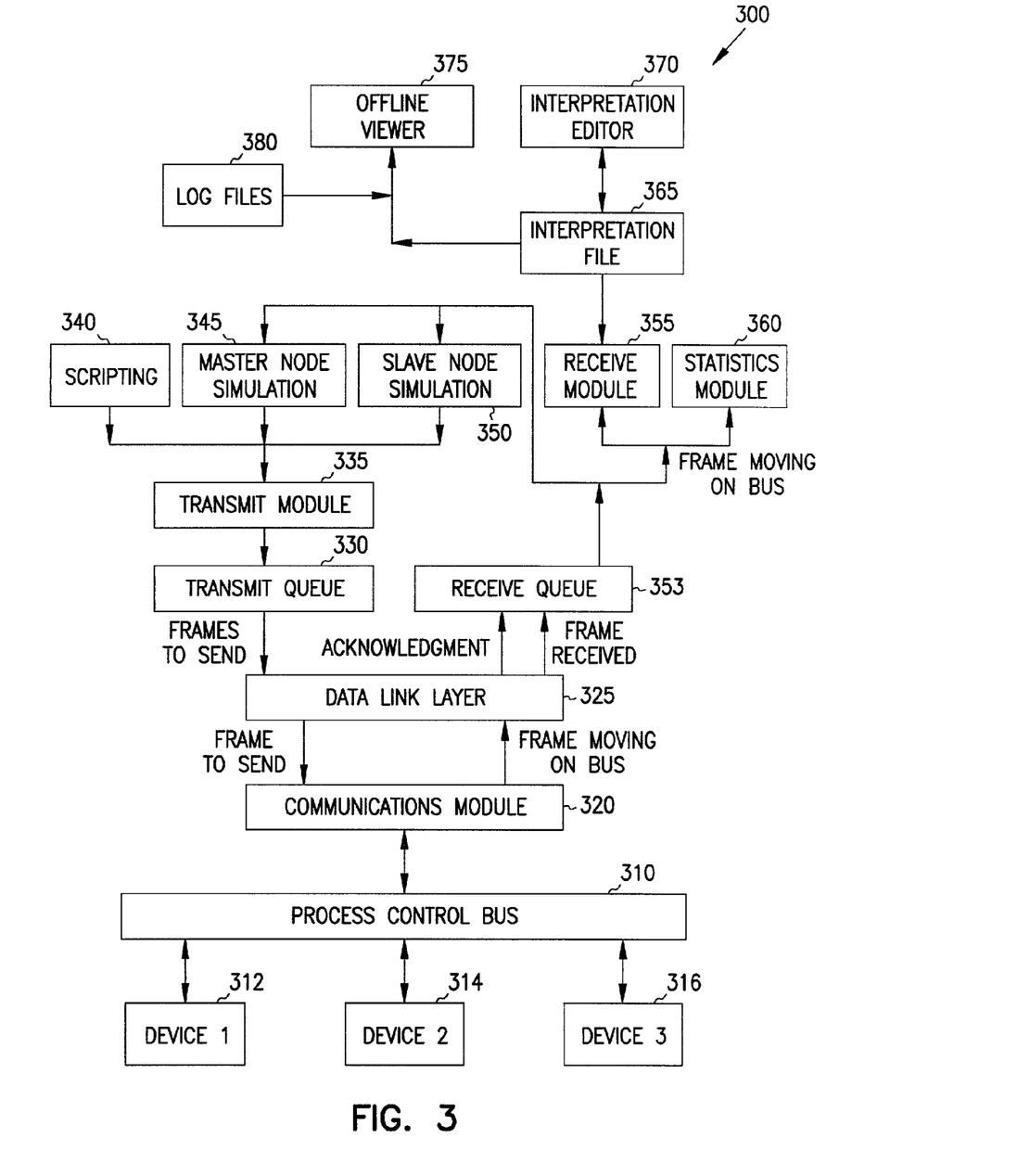
FIG. 3 is a block diagram of a protocol analyzer for implementing the analysis method of FIG. 2.

A protocol analyzer is shown generally at 300 in FIG. 3. A process control bus 310 is the communication network through which devices 312, 314 and 316 communicate with each other. A communication module 320 deals with monitoring (reading data from the bus 310 and writing data on to the bus). A network data link layer 325 has functionality to identify the packets of data. A transmit queue 330 and transmit module 335 deal with transmitting the data of user interest.

A scripting module 340, mater node simulation module 345 and slave node simulation module 350 are used for device simulation and help in testing the process control system. A receive queue 353 is used to receive the data that is moving on the process control bus 310. A receive module 355 and statistics module 360 are used to display the received data packets according to the protocol specifications. Receive module 355 interacts with an interpretation file 365 to give interpretation for the frames that are moving on the bus.

Interpretation file 365 is used to analyze the data packets, and an interpretation editor 370 is used to modify this interpretation file 365. An offlineviewer 375 also uses the interpretation file 365 for interpreting the data packets. Offlineviewer 375 uses a log file 380 that contains the data that is received on the process control bus. The log file 380 is generated by the receive module 355.

Figure 4:
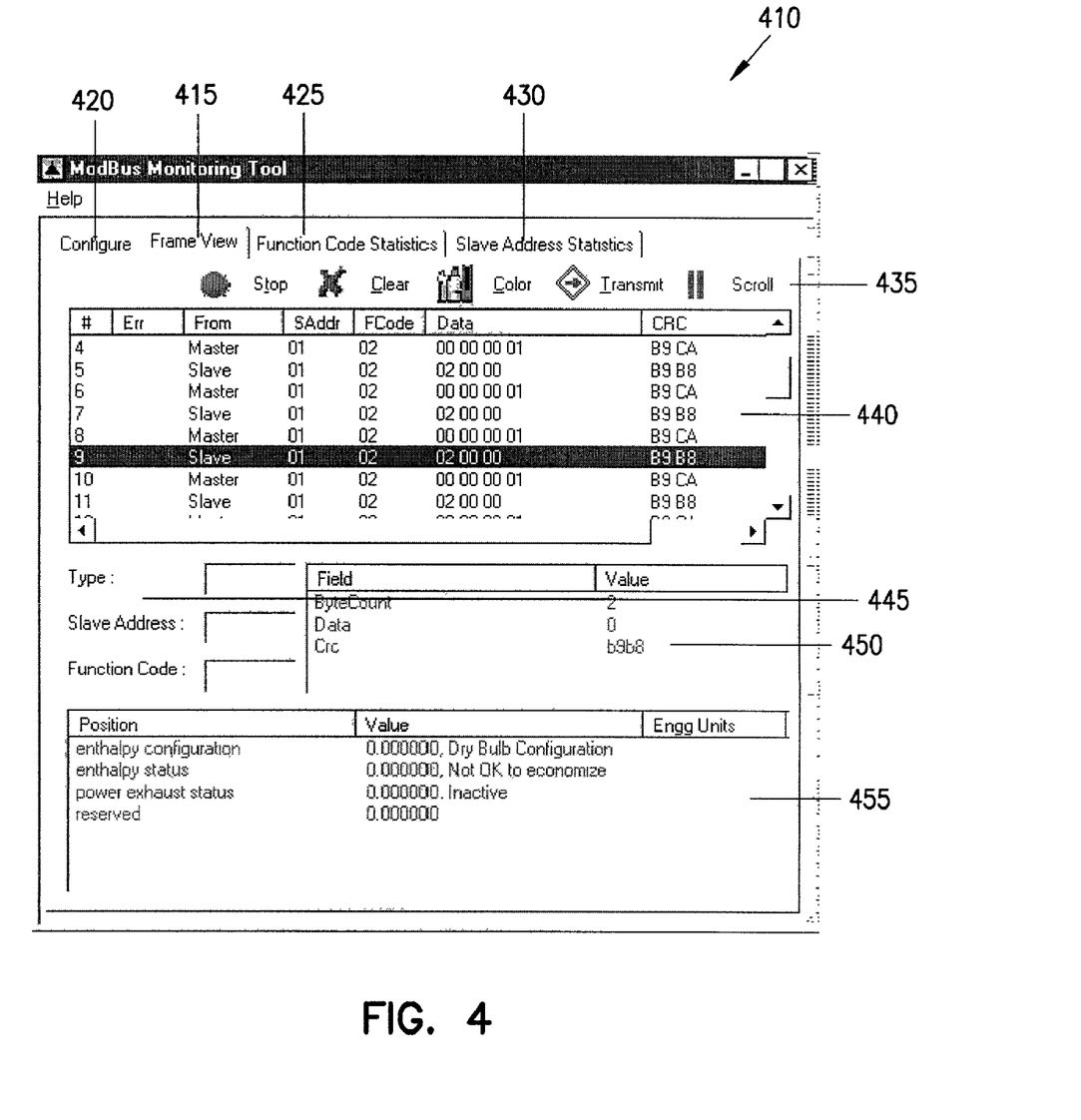
FIG. 4 is a computer screen shot generated by the protocol analyzer showing a frame view pane.

Graphical screens depicting the analysis and interpretation are shown in FIGS. 4–7. A number of tabs are provided in each of the screens to provide for ease of use. FIG. 4 shows a frame view screen 410 associated with a frame view tab 415. Other tabs include a configure tab 420, a function code statistics tab 425 and a slave address statistics tab 430. The frame view screen provides the user an easy way to view the data that is moving on the bus. This view has various panes, which helps user in viewing and understanding the data that is moving on the bus.

A scroll bar 435 provides for ease of navigation between frames. The user can view multiple frames in a pane 440. Before displaying the data packet to the user the data is split in the standard format. The user can select any message that is displayed in pane 440 and view the detailed interpretation of the same in panes 445, 450 and 455.

Pane 445 displays information regarding whether the data packet is sent by master or slave and slave address and the function code of it. Pane 450 provides a view of dissection of the data packet to the next level. Pane 445 provides a display of the interpretation of all the fields and their numerical values and their Engineering units and interpretation if any obtained from the text file. For example, the enthalpy configuration has a value of 0.0, which corresponds to a dry bulb configuration. This information is conveniently provided by comparing values in a frame or packet to the text file. Other information presented in pane 455 describes the enthalph status and not OK to economize and the power exhaust status as inactive. Engineering units (Engg Units) are the units in which a particular value is measured. For example, temperature can be measured in Celsius and Fahrenheit. Thus, the value of the data and the units are required for the information to be meaningful.

Figure 5:
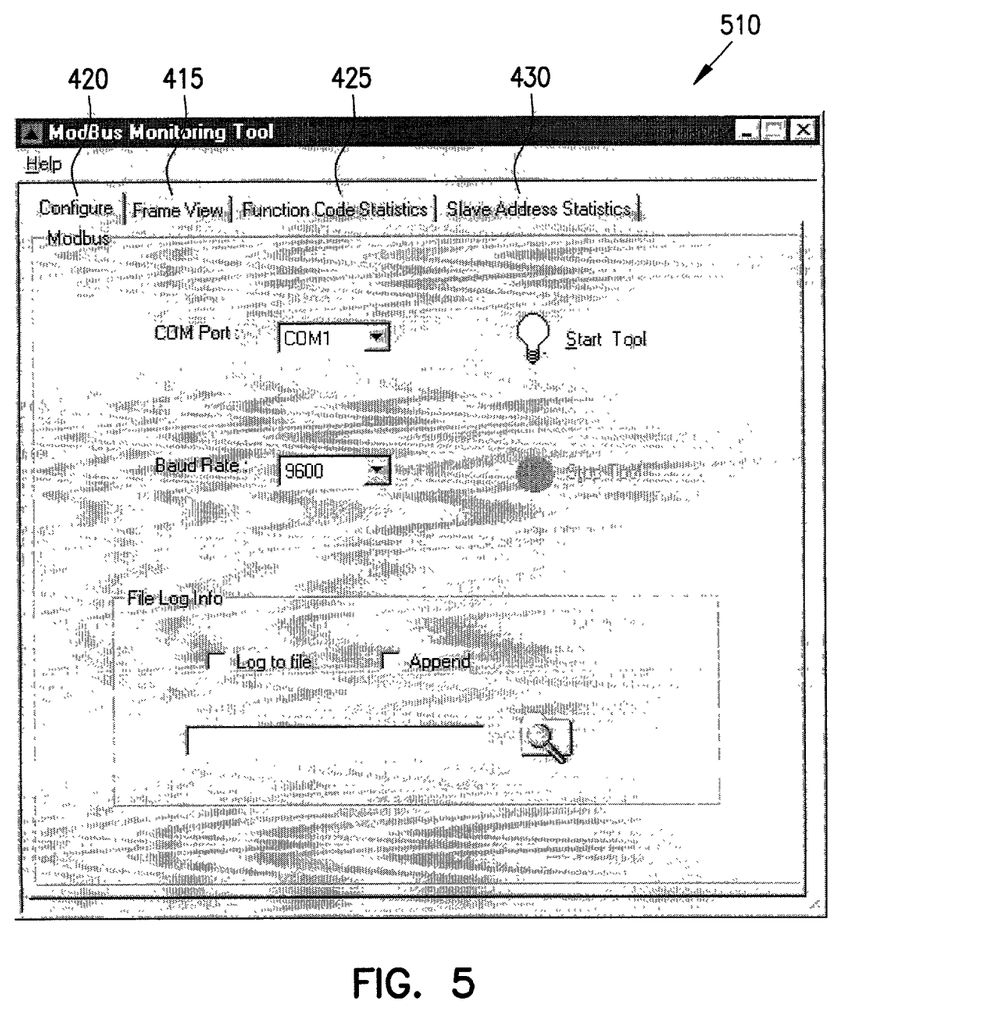
FIG. 5 is a computer screen shot generated by the protocol analyzer showing a configure pane.

The configure tab 420 provides access to a configuration screen 510 in FIG. 5. It provides information to help the user in configuring and setting options for monitoring the control bus. Information, such as the communications port and baud rate are provided. Configuration of logs is also provided.

Figure 6:
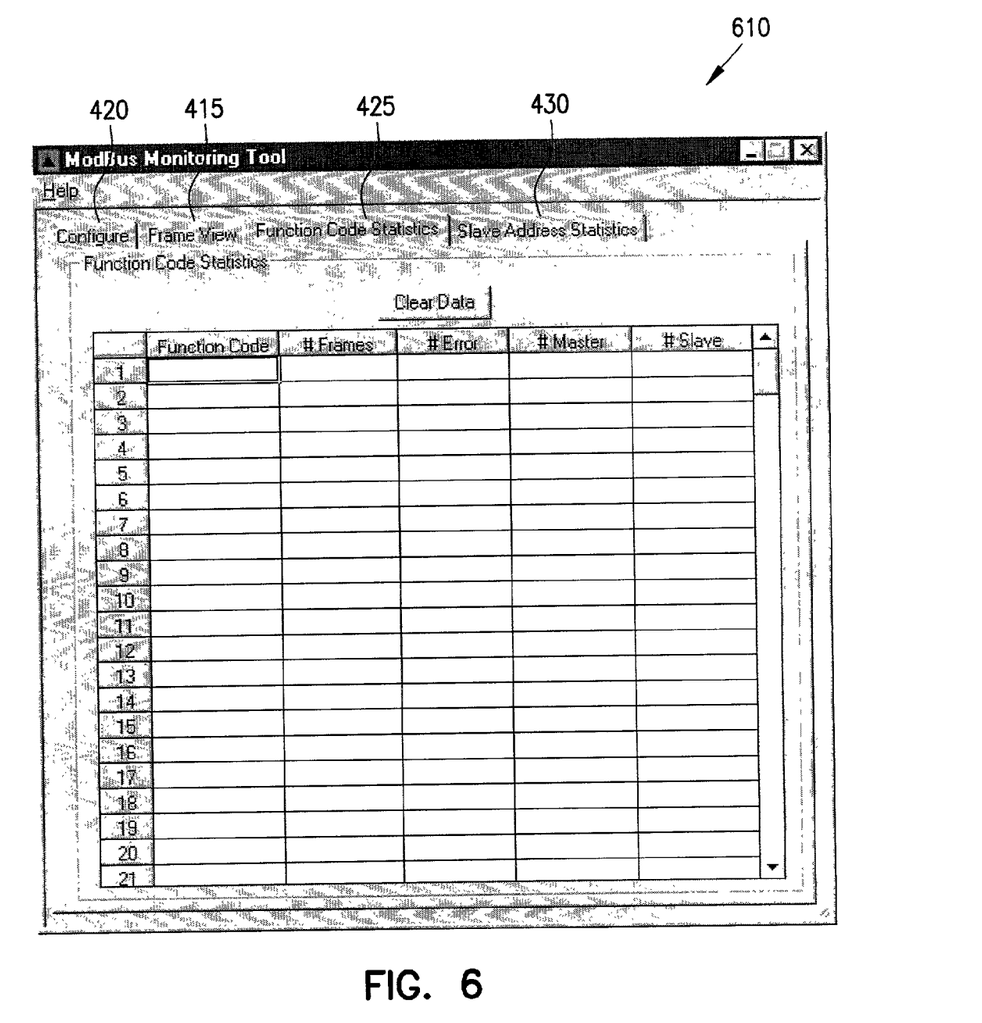
FIG. 6 is a computer screen shot generated by the protocol analyzer showing a function code statistics pane.
Figure 7:
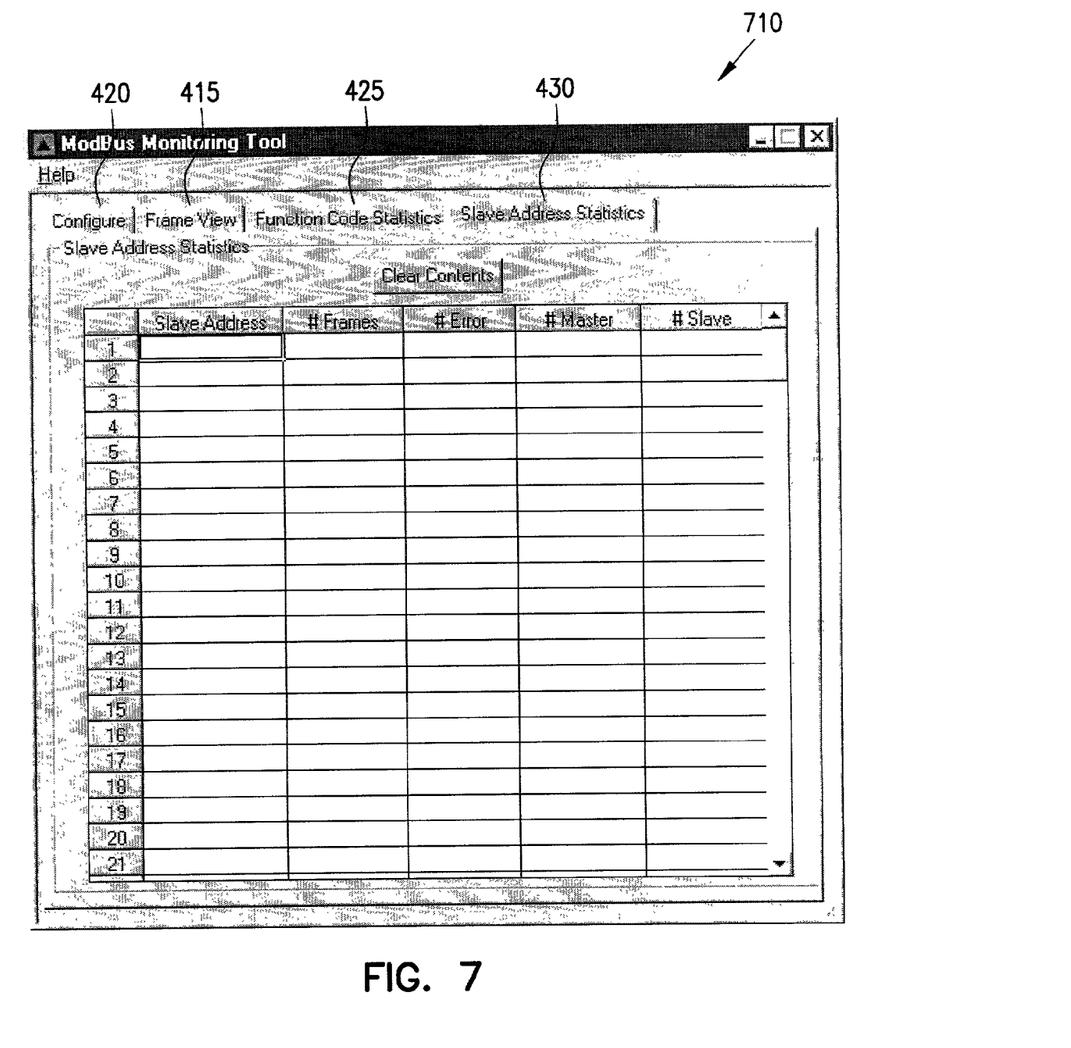
FIG. 7 is a computer screen shot generated by the protocol analyzer showing a slave address statistics pane.

The function code statistics tab 425 provides access to a function code statistics screen 610 in FIG. 6. The slave address statistics tab 430 provides access to a slave address statistics screen 710 in FIG. 7. The function code statistics screen 610 and lave address statistics screen 710 provide statistical information to users, such as function code, frame number, error number, master number and slave number.

The interpretation is customizable by the end user accordingly whenever the need for it arises. The whole interpretation is stored in the text file, which the user can modify. In that way, the user has both customization to their requirement and transparency.

CONCLUSION

A computer implemented method analyzes packets of data in frames on a process control bus. A frame is first selected, and a text file representative of specifications for the process control bus communication protocol is used to identify function code formats and calculate values and descriptions for the fields. A display of the values and fields is provided to the user. The display comprises a multi-pane screen of information that facilitates a user selecting a packet on the bus and viewing an interpretation of the data in the packet including values and descriptions for function codes as well as identifying the origination of the packet.

The automated display of information regarding packets on a bus saves considerable time and effort in installation and troubleshooting operation of the bus. It is also much more accurate than prior manual processes. This application is intended to cover any adaptations or variations of the present invention. It is manifestly intended that this invention be limited only by the claims and equivalents thereof.

The invention claimed is:

1. A computer implemented method of analyzing frames on a process control bus, the method comprising:
    selecting a frame to be analyzed;
    using a text file to identify function code formats; and
    calculating values for fields based on the function code formats.

2. The method of claim 1 and further comprising providing the values of the fields to a display.

3. The method of claim 1 and further comprising reading data from a text file prior to selecting a frame.

4. The method of claim 3 and further comprising storing data from the text file in a data structure.

5. The method of claim 4 and further comprising searching for a matching record for the frame in the data structure.

6. The method of claim 1 wherein calculating values for fields based on the function code formats comprises finding a value in the frame and matching it to a corresponding verbal description from the text file.

7. A computer readable medium having instructions stored thereon to cause a computer to implement a method of analyzing frames on a process control bus, the method comprising:
selecting a frame to be analyzed;
using a text file to identify function code formats; and
calculating values for fields based on the function code formats.

8. The computer readable medium of claim 7, wherein the method further comprises providing the values of the fields to a display.

9. The computer readable medium of claim 7, wherein the method further comprises reading data from a text file prior to selecting a frame.

10. A system for interpreting packets on a process control bus, the system comprising:
a communication module for coupling to the process control bus;
a receive queue that receives a frame from the communication module;
an interpretation file; and
a receive module that compares records in the frame with records in the interpretation file to provide a user viewable interpretation of the frame.

11. The system of claim 10 and further comprising a statistics module coupled to the receive queue for generating statistics regarding frames received from the process control bus.

12. The system of claim 11 wherein the statistics provide information selected from the group consisting of function codes, number of frames, errors, master identification and slave identification.

13. The system of claim 10 and further comprising a data link layer that identifies packets of data in frames.

14. The system of claim 10 and further comprising an interpretation editor for modifying the interpretation files.

15. The system of claim 10 wherein the interpretation file comprises a text file having information about data packets moving on the control bus.

16. The system of claim 15 wherein the text file comprises identifications of function codes and information regarding the interpretation of such function codes.

17. The system of claim 16 wherein the function codes are selected from the group consisting of power exhaust status, Enthalpy configuration, call for cooling, fan state, Enthalpy control, Enthalpy mode, shutdown, baud rate, slave address and reserved.

18. The system of claim 10 and further comprising means for converting an interpretation file into structured records a data structure for use by the receive module in interpreting frames.

19. The system of claim 10 and further comprising a log file coupled to the interpretation file, wherein the log file contains data received from the control bus.

20. The system of claim 19 and further comprising an offline viewer coupled to the log files and interpretation file that interprets data packets in frames.

21. A system for interpreting packets on a process control bus, the system comprising:
a receive queue that receives packets of data in frames on the process control bus;
an interpretation file; and
a receive module that compares records in the frame with records in the interpretation file to provide a user viewable interpretation of the frame, wherein the receive module generates a user viewable screen of information describing the frames, and comprising a pane for each selected frame that identifies interpretations of fields in the frame.

22. The system of claim 21 and further comprising a screen for configuring and setting options for monitoring frames on the process control bus.

23. The system of claim 21 and further comprising a statistics screen.

* * * * *

UNITED STATES PATENT AND TRADEMARK OFFICE
CERTIFICATE OF CORRECTION

| | | |
|---|---|---|
| PATENT NO. | : 7,174,482 B2 | Page 1 of 1 |
| APPLICATION NO. | : 09/849916 | |
| DATED | : February 6, 2007 | |
| INVENTOR(S) | : Voleti et al. | |

It is certified that error appears in the above-identified patent and that said Letters Patent is hereby corrected as shown below:

On title page, item (73), in "Assignee", in column 1, line 2, delete "NY" and insert -- NJ --, therefor.

In column 1, line 35, delete "masterpacket" and insert -- master packet --, therefor.

In column 4, line 50, after "215" insert -- . --.

In column 6, line 2, before "Modbus" insert -- ; --.

In column 6, lines 6–8, above "#02h, Status Data Read" delete "; Enviracom Monitoring Tool (EMT) Message Interpretation File, Rev 0.9.3 (Working) 28-Nov-2000".

In column 6, line 40, delete "codes01" and insert -- codes 01 --, therefor.

In column 7, line 6 (Table continued), above "U - Unsigned" delete "256.103US1".

In column 7, line 32 (Table Continued), delete "FFH" and insert -- FFh --, therefor.

In column 7, line 37 (Table Continued), below "- The entries are comma delimited. See example above." delete "256.103US1".

In column 7, line 62 (Table Continued), delete "02h" and insert -- #02h --, therefor.

In column 9, line 61 (Table Continued), after "Outdoor" insert -- Air --.

In column 11, line 18, delete "mater" and insert -- master --, therefor.

Signed and Sealed this

Seventeenth Day of July, 2007

JON W. DUDAS
*Director of the United States Patent and Trademark Office*